United States Patent
Chen et al.

(10) Patent No.: US 11,850,666 B2
(45) Date of Patent: Dec. 26, 2023

(54) HIGH-SPEED MACHINING TOOL MADE OF STEEL-BONDED CARBIDE AND METHOD FOR PREPARING THE SAME

(71) Applicant: Wenzhou University of Technology, Zhejiang (CN)

(72) Inventors: Haishao Chen, Wenzhou (CN); Xiaoxiao Huang, Wenzhou (CN); Zhonggen Su, Wenzhou (CN)

(73) Assignee: WENZHOU UNIVERSITY OF TECHNOLOGY, Wenzhou (CN)

( * ) Notice: Subject to any disclaimer, the term of this patent is extended or adjusted under 35 U.S.C. 154(b) by 0 days.

(21) Appl. No.: 18/093,821

(22) Filed: Jan. 6, 2023

(65) Prior Publication Data

US 2023/0211421 A1 Jul. 6, 2023

(30) Foreign Application Priority Data

Jan. 6, 2022 (CN) .......................... 202210009667.2

(51) Int. Cl.
| | |
|---|---|
| *B23B 27/08* | (2006.01) |
| *B22F 3/10* | (2006.01) |
| *B22F 3/15* | (2006.01) |
| *C22C 38/00* | (2006.01) |
| *C22C 38/04* | (2006.01) |
| *C22C 38/22* | (2006.01) |

(Continued)

(52) U.S. Cl.
CPC .............. *B23B 27/083* (2013.01); *B22F 3/10* (2013.01); *B22F 3/15* (2013.01); *C22C 38/002* (2013.01); *C22C 38/04* (2013.01); *C22C 38/22* (2013.01); *C22C 38/24* (2013.01); *B22F 2003/242* (2013.01); *B22F 2003/247* (2013.01); *B22F 2005/002* (2013.01); *B22F 2301/35* (2013.01); *B22F 2302/10* (2013.01); *B22F 2302/25* (2013.01); *B22F 2302/45* (2013.01); *B22F 2998/10* (2013.01); *B23B 2222/32* (2013.01)

(58) Field of Classification Search
CPC ......... B32B 27/083; B22F 3/10; B23B 27/08; B23B 2222/84; B23B 2222/32; B23B 2228/10; B23B 2265/08
See application file for complete search history.

(56) References Cited

FOREIGN PATENT DOCUMENTS

| CN | 113369543 A | * | 9/2021 |
| JP | 09296256 A | * | 11/1997 |

OTHER PUBLICATIONS

English translation of abstract of JP 09296256 (Year: 1997).*
English translation of CN 113369543 (Year: 2021).*

* cited by examiner

*Primary Examiner* — Alan Snyder
(74) *Attorney, Agent, or Firm* — Leong C. Lei

(57) ABSTRACT

A high-speed machining tool made of a steel-bonded carbide and a method for preparing the same relate to the technical field of lathe tools made of steel-bonded carbides, and overcome the problems of traditional steel-bonded carbide lathe tools about low hardness and low toughness. The high-speed machining tool includes a skeleton, a main body, and a coating. The main body is consolidated by the skeleton from inside. The skeleton and the main body are both ringlike in shape. The main body has its outer surface covered by the coating. The high-speed machining tool is such made that the skeleton is hard and the main body is tough. The blade of the tool is hard and can transfer vibrations to the main body, thereby protecting the tool from brittle fractures and improving the overall performance of the tool.

10 Claims, 3 Drawing Sheets

(51) Int. Cl.
*C22C 38/24* (2006.01)
*B22F 3/24* (2006.01)
*B22F 5/00* (2006.01)

```
┌─────────────────────────────────────────────────────────────┐
│ blank making for the skeleton: measuring, powdering,        │
│ shifting, and mixing predetermined mass proportions of      │── S101
│ C, W, Cr, Mn, V, and Fe into a mixture, placing the         │
│ mixture into a mold, and performing hot isostatic           │
│ pressing on the mixture to form a blank of the skeleton     │
└─────────────────────────────────────────────────────────────┘
                              ↓
┌─────────────────────────────────────────────────────────────┐
│ blank making for the main body: measuring, powdering,       │
│ shifting, and mixing predetermined mass proportions of      │
│ C, W, Cr, Mn, V, and Fe into a second mixture, placing      │── S102
│ the second mixture into a second mold, placing the blank    │
│ of the skeleton into the second mixture in the second       │
│ mold, and performing hot isostatic pressing on the second   │
│ mixture to form a blank of the main body containing         │
│ therein the blank of the skeleton                           │
└─────────────────────────────────────────────────────────────┘
                              ↓
┌─────────────────────────────────────────────────────────────┐
│ sintering: sintering the blank of the main body that        │
│ contains therein the blank of the skeleton in a sintering   │── S103
│ furnace at 1100°C                                           │
└─────────────────────────────────────────────────────────────┘
                              ↓
┌─────────────────────────────────────────────────────────────┐
│ grinding: grinding the outer surface of the main body       │
│ after sintering into a rough surface that has a specific    │── S104
│ texture                                                     │
└─────────────────────────────────────────────────────────────┘
                              ↓
┌─────────────────────────────────────────────────────────────┐
│ coating: preparing a coating material from $Cr_2C_3$, NiCr, │
│ WC, TaC, Co, and Fe, and applying the coating material      │── S105
│ to the surface of the main body using a plasma-assisted     │
│ CVD method to form the coating                              │
└─────────────────────────────────────────────────────────────┘
                              ↓
┌─────────────────────────────────────────────────────────────┐
│ immersing: immersing a blade at an outer edge of the main   │── S106
│ body into oil for preservation                              │
└─────────────────────────────────────────────────────────────┘
```

FIG. 3

HIGH-SPEED MACHINING TOOL MADE OF STEEL-BONDED CARBIDE AND METHOD FOR PREPARING THE SAME

BACKGROUND OF THE INVENTION

1. Technical Field

The present invention relates to lathe tools made of steel-bonded carbides, and more particularly to a high-speed machining tool made of a steel-bonded carbide and a method for preparing the same.

2. Description of Related Art

A steel-bonded carbide is a cemented carbide formed by using a hard compound of refractory metal as the hard phase and using steel as the binding phase. A steel-bonded carbide has not only the outstanding hardness and wear resistance of carbides but also good mechanical properties of steel, making it very suitable for wear parts and mechanical components. The common textural feature of steel-bonded carbides is even distribution of tiny hard-phase particles across the steel substrate.

A prior patent numbered CN201910541201.5 discloses a carbide blade and a preparation method thereof, related to mechanical technologies. The known carbide blade overcomes the application limitations of the traditional, less-versatile cutting blades. The known carbide blade is made by using Co as the binding phase, and using tungsten carbide and a titanium-containing cubic-phase compound as the hard phase. The binding phase takes a mass fraction of 4.5 wt. %-9.5 wt. %, and the hard phase takes a mass fraction of 90.5 wt. %-95.5 wt. %. The titanium-containing cubic-phase compound takes mass fraction of 2 wt. %-8 wt. % of the blade. The grain distribution of tungsten carbide has a double-peak structure. Tungsten carbide is present in the forms of both coarse-grained tungsten carbide and fine-grained tungsten carbide. The coarse-grained WC has an average grain size of 1.5-3.0 μm, and the fine-grained WC has an average grain size of 0.4-1.0 μm.

Another prior patent numbered CN201210552350.X provides a new method for preparing (WC/high-speed steel) steel-bonded cemented carbide by employing high-speed solid-phase particles such as WC, TiC or VC to perform injection deposition on a high-speed molten steel flow, and a new steel type for superhard cutter steel and hot work die steel. The invention provides a new technology for preparing armoring and special composite wear-resistant parts formed by compounding two layers or multiple layers of WC super-hard high-speed steel and plain carbon steel or stainless steel. The invention provides a technical means for performing high-energy rapid quenching on molten steel, and under all kinds of technological states, the prepared (WC/high-speed steel) steel-bonded cemented carbide possesses the mechanical properties comprehensively better than those of conventional high-speed steel. However, neither of the cemented carbide blade disclosed in the prior patent and the steel-bonded carbide blade made using high-speed solid-phase particles such as WC, TiC or VC to perform injection deposition on a high-speed molten steel flow can have satisfying balance between hardness and toughness. A blade having high toughness and low hardness is inferior in machining precision, making its applications limited to rough machining. On the other hand, a blade having high hardness and low toughness tends to be too thin to prevent brittle fractures.

SUMMARY OF THE INVENTION

The primary objective of the present invention is to provide a high-speed machining tool made of a steel-bonded carbide and a method for preparing the same. In the high-speed machining tool, the skeleton is provided with a plurality of round through holes. Through the round through holes, parts of the main body surrounding the skeleton can be formed as a whole, so as to combine the main body and the skeleton into a unity through sintering, thereby ensuring the structural integrity of the steel-bonded carbide lathe tool. The high-speed machining tool is such made that the skeleton is hard and the main body is tough. The blade of the tool is hard and can transfer vibrations to the main body. With the configuration, the present invention overcomes the problems of the prior art by protecting the tool from brittle fractures and improving the overall performance of the tool.

For achieving the foregoing objective, the present invention provides a high-speed machining tool made of a steel-bonded carbide, which comprises a skeleton, a main body, and a coating; the main body being consolidated by the skeleton from inside; the skeleton and the main body both being ringlike in shape, the main body having an outer surface covered by the coating, the skeleton comprising, by mass, C: 0.6-0.8%, W: 12-22%, Cr: 2-8%, Mn: 0.1-0.6%, V: 0.1-0.6%, and Fe for the balance to 100%; the main body comprising, by mass, C: 0.1-0.6%, W: 12-22%, Cr: 2-8%, Mn: 0.1-0.6%, V: 0.1-0.6%, and Fe for the balance to 100%; the coating comprising, by mass, $Cr_2C_3$: 28-32%, NiCr: 21-28%, WC: 5-12%, TaC: 5-10%, Co: 3-5%, and Fe for the balance to 100%; and the skeleton having a thickness decreased gradually from an inner side to an outer side thereof so that a blade is formed at an edge of the outer side.

Further, the skeleton is provided with a plurality of round through holes and each of the round through holes has two ends each formed into a spreading trumpet-like shape.

Further, the skeleton comprises, by mass, C: 0.6-0.8%, W: 12-22%, Cr: 2-8%, Mn: 0.1-0.6%, V: 0.1-0.6%, F: 0-0.1%, and Fe for the balance to 100%.

Further, the skeleton comprises, by mass, C: 0.6-0.8%, W: 12-22%, Cr: 2-8%, Mn: 0.1-0.6%, V: 0.1-0.6%, $ZrO_2$: 0.6-0.8%, F: 0-0.1%, and Fe for the balance to 100%.

Further, skeleton comprises, by weight, C: 0.67%, W: 18.91%, Cr: 5.47%, Mn: 0.11%, V: 0.29%, $ZrO_2$: 0.67%, F: 0.1%, and Fe for the balance to 100%.

Further, main body comprises, by mass, C: 0.1-0.6%, W: 12-22%, Cr: 2-8%, Mn: 0.1-0.6%, V: 0.1-0.6%, $CrO_2$: 0.2-0.8%, and Fe for the balance to 100%.

Further, the main body comprises, by mass, C: 0.35%, W: 18.91%, Cr: 4.47%, Mn: 0.11%, V: 0.29%, $CrO_2$: 0.42%, and Fe for the balance to 100%.

Further, the coating comprises, by mass, $Cr_2C_3$: 28-32%, NiCr: 21-28%, WC: 5-12%, TaC: 5-10%, Co: 3-5%, a resin powder: 3-12%, and Fe for the balance to 100%.

Further, the coating comprises, by mass, $Cr_2C_3$: 28%, NiCr: 23%, WC: 8%, TaC: 8%, Co: 4%, the resin powder: 8%, and Fe for the balance to 100%.

According to another aspect, the present invention provides a method for preparing a high-speed machining tool from a steel-bonded carbide, which comprises the following steps:

S101, blank making for the skeleton: measuring, powdering, shifting, and mixing predetermined mass proportions of C, W, Cr, Mn, V, and Fe into a mixture, placing the mixture into a mold, and performing hot isostatic pressing on the mixture to form a blank of the skeleton;

S102, blank making for the main body: measuring, powdering, shifting, and mixing predetermined mass proportions of C, W, Cr, Mn, V, and Fe into a second mixture, placing the second mixture into a second mold, placing the blank of the skeleton into the second mixture in the second mold, and performing hot isostatic pressing on the second mixture to form a blank of the main body containing therein the blank of the skeleton;

S103, sintering: sintering the blank of the main body that contains therein the blank of the skeleton in a sintering furnace at 1100° C.;

S104, grinding: grinding the outer surface of the main body after sintering into a rough surface that has a specific texture;

S105, coating: preparing a coating material from $Cr_2C_3$, NiCr, WC, TaC, Co, and Fe, and applying the coating material to the surface of the main body using a plasma-assisted CVD method to form the coating; and S106, immersing: immersing a blade at an outer edge of the main body into oil for preservation.

As compared to the prior art, the present invention has the following beneficial effects:

1. In the disclosed high-speed machining tool and the method for preparing the same, skeleton is provided with a plurality of round through holes. Through the round through holes, parts of the main body surrounding the skeleton can be formed as a whole, so as to combine the main body and the skeleton into a unity through sintering, thereby ensuring the structural integrity of the steel-bonded carbide lathe tool. The high-speed machining tool is such made that the skeleton is hard and the main body is tough. With the configuration, vibrations can be transferred to the main body, thereby protecting the tool from brittle fractures and improving the overall performance of the tool.
2. In the disclosed high-speed machining tool and the method for preparing the same, addition of $ZrO_2$ significantly increases the hardness of the skeleton while basically retaining the toughness and eliminating generation of cracks, so the resulting tool is suitable for processing applications where high machining precision is expected form a high-hardness tool.
3. In the disclosed high-speed machining tool and the method for preparing the same, addition of $CrO_2$, significantly increases the toughness of the main body and prevents the main body from breakage.

DETAILED DESCRIPTION OF THE INVENTION

To make the foregoing objectives, features, and advantages of the present invention clearer and more understandable, the following description will be directed to some embodiments as depicted in the accompanying drawings to detail the technical schemes disclosed in these embodiments. It is, however, to be understood that the embodiments referred herein are only a part of all possible embodiments and thus not exhaustive. Based on the embodiments of the present invention, all the other embodiments can be conceived without creative labor by people of ordinary skill in the art, and all these and other embodiments shall be encompassed in the scope of the present invention.

Embodiment 1

Figure 1:
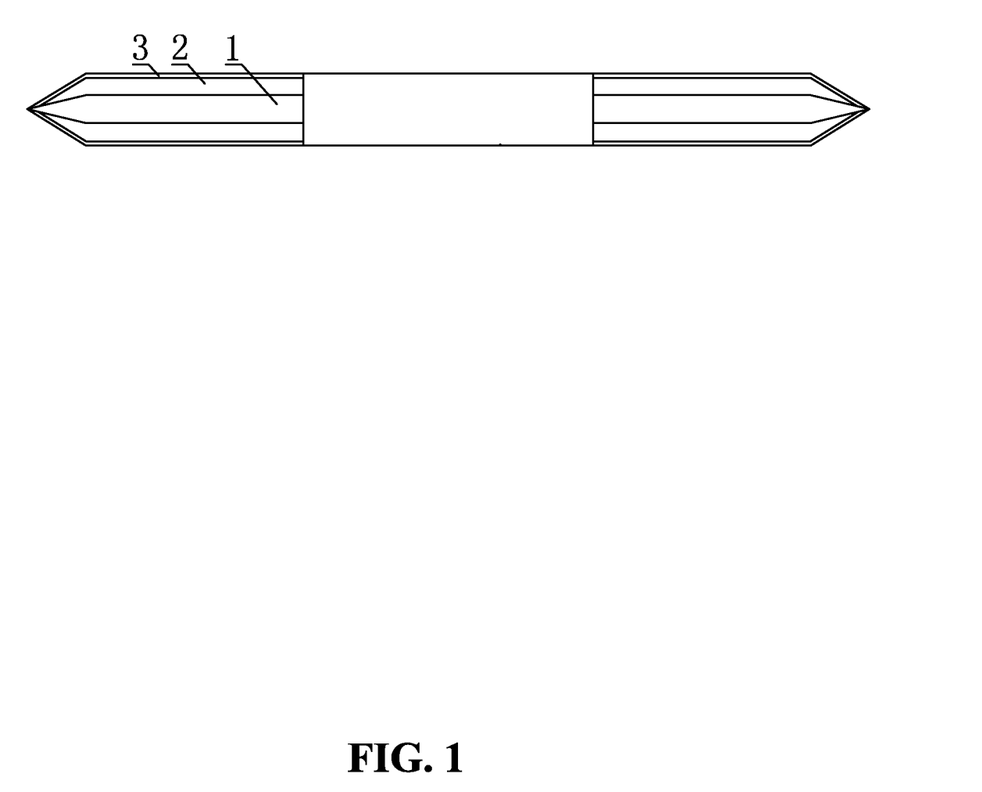
FIG. 1 is a schematic drawing showing the overall structure of a high-speed machining tool made of a steel-bonded carbide according to the present invention.
Figure 2:
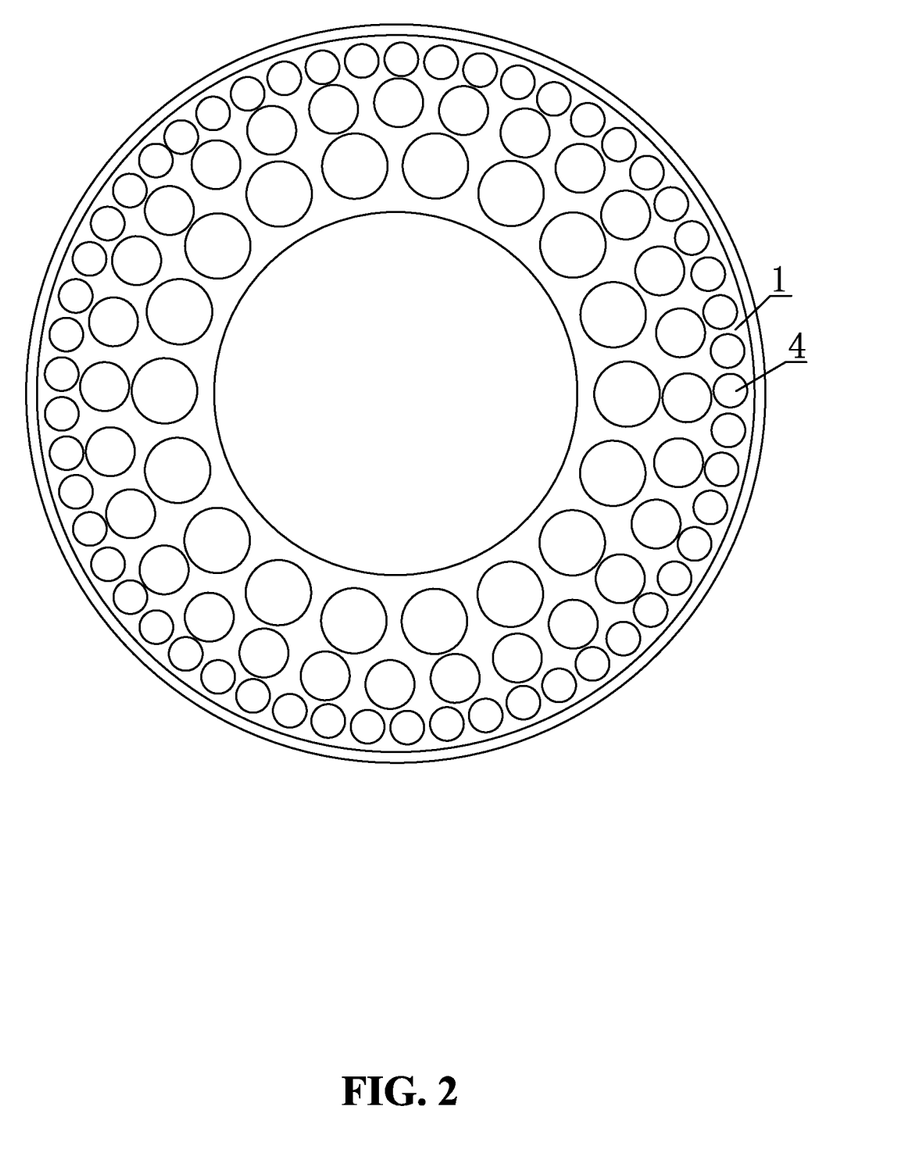
FIG. 2 is a transverse cross-sectional view of a skeleton in the high-speed machining tool according to the present invention.

Referring to FIG. 1 and FIG. 2, an HSM (high-speed machining) lathe tool made of a steel-bonded carbide comprises a skeleton 1, a main body 2, and a coating 3. The main body 2 is consolidated by the skeleton 1 from inside. The skeleton 1 and the main body 2 are both ringlike in shape. The main body 2 has its outer surface covered by the coating 3. Therein, the skeleton 1 comprises, by mass, C: 0.67%, W: 18.91%, Cr: 5.47%, Mn: 0.11%, V: 0.29%, and Fe for the balance to 100%. The main body 2 comprises, by mass, C: 0.67%, W: 18.91%, Cr: 5.47%, Mn: 0.11%, V: 0.29%, and Fe for the balance to 100%. The coating 3 comprises, by mass, $Cr_2C_3$: 28%, NiCr: 23%, WC: 8%, TaC: 8%, Co: 4%, and Fe for the balance to 100%. The skeleton 1 has a thickness decreased gradually from an inner side to an outer side thereof so that a blade is formed at an edge of the outer side. The skeleton 1 is provided with a plurality of round through holes 4. Each of the round through holes 4 has two ends each formed into a spreading trumpet-like shape. Through the round through holes 4, parts of the main body 2 surrounding the skeleton 1 can be formed as a whole, so as to combine the main body 2 and the skeleton 1 into a unity through sintering, thereby ensuring the structural integrity of the steel-bonded carbide lathe tool.

Embodiment 2

The present embodiment is similar to Embodiment 1 except that fluorine (F) is additionally used in the present embodiment. Fluorine is helpful in preventing molten steel from oxidization during sintering, and increasing the viscosity between adjacent particles, so as to reduce the risk that sintering causes longitudinal and transverse cracks on the formed steel blanks during sintering.

In the present embodiment, the high-speed machining tool made of a steel-bonded carbide comprises a skeleton 1, a main body 2, and a coating 3. The main body 2 is consolidated by the skeleton 1 from inside. The skeleton 1 and the main body 2 are both ringlike in shape. The main body 2 has its outer surface covered by the coating 3. Therein, skeleton 1 comprises, by weight, C: 0.67%, W: 18.91%, Cr: 5.47%, Mn: 0.11%, V: 0.29%, F: 0.1%, and Fe for the balance to 100%. The main body 2 comprises, by mass, C: 0.67%, W: 18.91%, Cr: 5.47%, Mn: 0.11%, V: 0.29%, and Fe for the balance to 100%. The coating 3 comprises, by mass, $Cr_2C_3$: 28%, NiCr: 23%, WC: 8%, TaC: 8%, Co: 4%, and Fe for the balance to 100%. The skeleton 1 has a thickness decreased gradually from an inner side to an outer side thereof so that a blade is formed at an edge of the outer side. The skeleton 1 is provided with a plurality of round through holes 4. Each of the round through holes 4 has two ends each formed into a spreading trumpet-like shape. Through the round through holes 4, parts of the main body 2 surrounding the skeleton 1 can be formed as a whole, so as to combine the main body 2 and the skeleton 1 into a unity through sintering, thereby ensuring the structural integrity of the steel-bonded carbide lathe tool.

In some examples, different versions of the skeleton 1 were made using the following Formula 1 through Formula 3.

For the skeleton 1, Formula 1 was composed of, by weight, C: 0.67%, W: 18.91%, Cr: 5.47%, Mn: 0.11%, V: 0.29%, F: 0.03%, and Fe for the balance to 100%; Formula 2 was composed of, by weight, C: 0.67%, W: 18.91%, Cr: 5.47%, Mn: 0.11%, V: 0.29%, F: 0.07%, and Fe for the balance to 100%; and Formula 3 composed of, by weight, C: 0.67%, W: 18.91%, Cr: 5.47%, Mn: 0.11%, V: 0.29%, F: 0.10%, and Fe for the balance to 100%. The different versions of the skeleton 1 made using the three formulas were then tested for performance, and the results are shown in Table 1 below:

TABLE 1

Impact of the F content on performance of the skeleton 1

| | C % | W % | Cr % | Mn % | V % | Fe % | F % | Oxidation Ratio | Hardness HRC | Crack |
|---|---|---|---|---|---|---|---|---|---|---|
| Embodiment 1 | 0.67 | 5.47 | 18.91 | 0.11 | 0.29 | Balance | 0.00 | 2.2% | 62 | A few |
| Formula 1 | 0.67 | 5.47 | 18.91 | 0.11 | 0.29 | Balance | 0.03 | 1.4% | 65 | No |
| Formula 2 | 0.67 | 5.47 | 18.91 | 0.11 | 0.29 | Balance | 0.07 | 0.8% | 67 | No |
| Formula 3 | 0.67 | 5.47 | 18.91 | 0.11 | 0.29 | Balance | 0.10 | 0.2% | 68 | No |

As can be learned from the table above, as the control, the formula of Embodiment 1 did not contain fluorine. The resulting skeleton 1 had an oxidation ratio of 2.2%, hardness of 62HRC, and has a few cracks. As to Formula 1 that contained 0.03% fluorine, the resulting skeleton 1 had an oxidation ratio of 1.4%, hardness of 65HRC, and did not have any crack. As to Formula 2 that contained 0.07% fluorine, the resulting skeleton 1 had an oxidation ratio of 0.8%, hardness of 67HRC, and did not have any crack. As to Formula 3 that contained 0.10% fluorine, the resulting skeleton 1 had an oxidation ratio of 0.2%, hardness of 68HRC, and did not have any crack. It is thus clear that addition and increase of the element fluorine help to increase the hardness of the skeleton 1, eliminate cracks, and lower the oxidation ratio. According to the present embodiment, it is determined that a formula composed of, by weight, C: 0.67%, W: 18.91%, Cr: 5.47%, Mn: 0.11%, V: 0.29%, F: 0.10%, and Fe for the balance to 100% is optimal for the skeleton 1.

Embodiment 3

The present embodiment is similar to Embodiment 2 except that $ZrO_2$ is additionally used in the present embodiment. Addition of $ZrO_2$ significantly increases the hardness of the skeleton 1 while basically retaining the toughness and eliminating generation of cracks, so the resulting tool is suitable for processing applications where high machining precision is expected form a high-hardness tool.

In the present embodiment, a high-speed machining tool made of a steel-bonded carbide comprises a skeleton 1, a main body 2, and a coating 3. The main body 2 is consolidated by the skeleton 1 from inside. The skeleton 1 and the main body 2 are both ringlike in shape. The main body 2 has its outer surface covered by the coating 3. Therein, the skeleton 1 comprises, by mass, C: 0.67%, W: 18.91%, Cr: 5.47%, Mn: 0.11%, V: 0.29%, $ZrO_2$: 0.67%, F: 0.1%, and Fe for the balance to 100%. The main body 2 comprises, by mass, C: 0.67%, W: 18.91%, Cr: 5.47%, Mn: 0.11%, V: 0.29%, and Fe for the balance to 100%. The coating 3 comprises, by mass, $Cr_2C_3$: 28%, NiCr: 23%, WC: 8%, TaC: 8%, Co: 4%, and Fe for the balance to 100%. The skeleton 1 has a thickness decreased gradually from an inner side to an outer side thereof so that a blade is formed at an edge of the outer side. The skeleton 1 is provided with a plurality of round through holes 4. Each of the round through holes 4 has two ends each formed into a spreading trumpet-like shape. Through the round through holes 4, parts of the main body 2 surrounding the skeleton 1 can be formed as a whole, so as to combine the main body 2 and the skeleton 1 into a unity through sintering, thereby ensuring the structural integrity of the steel-bonded carbide lathe tool.

In some examples, different versions of the skeleton 1 were made using the following Formula 4 through Formula 6.

For the skeleton 1, Formula 4 was composed of, by weight, C: 0.67%, W: 18.91%, Cr: 5.47%, Mn: 0.11%, V: 0.29%, $ZrO_2$: 0.60%, F: 0.1%, and Fe for the balance to 100%; Formula 5 was composed of, by weight, C: 0.67%, W: 18.91%, Cr: 5.47%, Mn: 0.11%, V: 0.29%, $ZrO_2$: 0.67%, F: 0.1%, and Fe for the balance to 100%; and Formula 6 was composed of, by weight, C: 0.67%, W: 18.91%, Cr: 5.47%, Mn: 0.11%, V: 0.29%, $ZrO_2$: 0.80%, F: 0.1%, and Fe for the balance to 100%. The different versions of the skeleton 1 made using the three formulas were then tested for performance, and the results are shown in Table 2 below:

TABLE 2

Impact of $ZrO_2$ on performance of the skeleton 1

| | C % | W % | Cr % | Mn % | V % | Fe % | F % | $ZrO_2$% | Toughness N/mm² | Hardness HRC |
|---|---|---|---|---|---|---|---|---|---|---|
| Embodiment 1 | 0.67 | 5.47 | 18.91 | 0.11 | 0.29 | Balance | 0.1 | 0.00 | 4325 | 62 |
| Formula 4 | 0.67 | 5.47 | 18.91 | 0.11 | 0.29 | Balance | 0.1 | 0.60 | 4335 | 72 |
| Formula 5 | 0.67 | 5.47 | 18.91 | 0.11 | 0.29 | Balance | 0.1 | 0.67 | 4323 | 75 |
| Formula 6 | 0.67 | 5.47 | 18.91 | 0.11 | 0.29 | Balance | 0.1 | 0.80 | 4341 | 78 |

As can be learned from the table above, the formula of Embodiment 1 did not contain $ZrO_2$. The resulting skeleton 1 had hardness HRC of 62 and toughness of 4325 N/mm². As to Formula 4 that contained 0.60% $ZrO_2$, the resulting skeleton 1 had hardness HRC of 72 and toughness of 4335 N/mm². As to Formula 5 that contained 0.67% $ZrO_2$, the resulting skeleton 1 had hardness HRC of 75 and toughness of 4323 N/mm². As to Formula 6 that contained 0.80% $ZrO_2$, the resulting skeleton 1 had hardness HRC of 78 and toughness of 4341 N/mm². It is thus clear that addition and increase of $ZrO_2$ help to significantly increase the hardness of the skeleton 1. According to the present embodiment, it is determined that a formula composed of, by weight, C: 0.67%, W: 18.91%, Cr: 5.47%, Mn: 0.11%, V: 0.29%, $ZrO_2$: 0.67%, F: 0.1%, and Fe for the balance to 100% is optimal for the skeleton 1.

Embodiment 4

The present embodiment is similar to Embodiment 1 except that $CrO_2$ is additionally used in the present embodiment to significantly increase the toughness of the main body 2 and prevent the main body 2 from breakage.

In the present embodiment, a high-speed machining tool made of a steel-bonded carbide comprises a skeleton 1, a main body 2, and a coating 3. The main body 2 is consolidated by the skeleton 1 from inside. The skeleton 1 and the main body 2 are both ringlike in shape. The main body 2 has its outer surface covered by the coating 3. Therein, the skeleton 1 comprises, by mass, C: 0.67%, W: 18.91%, Cr: 5.47%, Mn: 0.11%, V: 0.29%, and Fe for the balance to 100%. The main body 2 comprises, by mass, C: 0.35%, W: 18.91%, Cr: 4.47%, Mn: 0.11%, V: 0.29%, $CrO_2$: 0.42%, and Fe for the balance to 100%. The coating 3 comprises, by mass, $Cr_2C_3$: 28%, NiCr: 23%, WC: 8%, TaC: 8%, Co: 4%, and Fe for the balance to 100%. The skeleton 1 has a thickness decreased gradually from an inner side to an outer side thereof so that a blade is formed at an edge of the outer side. The skeleton 1 is provided with a plurality of round through holes 4. Each of the round through holes 4 has two ends each formed into a spreading trumpet-like shape. Through the round through holes 4, parts of the main body 2 surrounding the skeleton 1 can be formed as a whole, so as to combine the main body 2 and the skeleton 1 into a unity through sintering, thereby ensuring the structural integrity of the steel-bonded carbide lathe tool.

In some examples, different versions of the main body 2 were made using the following Formula 7 through Formula 9.

For the main body 2, Formula 7 was composed of, by weight, C: 0.35%, W: 18.91%, Cr: 4.47%, Mn: 0.11%, V: 0.29%, $CrO_2$: 0.20%, and Fe for the balance to 100%; Formula 8 was composed of, by weight, C: 0.35%, W: 18.91%, Cr: 4.47%, Mn: 0.11%, V: 0.29%, $CrO_2$: 0.42%, and Fe for the balance to 100%; and Formula 9 was composed of, by weight, C: 0.35%, W: 18.91%, Cr: 4.47%, Mn: 0.11%, V: 0.29%, $CrO_2$: 0.80%, and Fe for the balance to 100%. The different versions of the main body 2 made using the three formulas were then tested for performance, and the results are shown in Table 3 below:

TABLE 3

Impact of $CrO_2$ on performance of the main body 2

| | C % | W % | Cr % | Mn % | V % | Fe % | $CrO_2$% | Toughness N/mm² | Hardness HRC |
|---|---|---|---|---|---|---|---|---|---|
| Embodiment 1 | 0.67 | 5.47 | 18.91 | 0.11 | 0.29 | Balance | 0.00 | 4325 | 62 |
| Formula 4 | 0.67 | 5.47 | 18.91 | 0.11 | 0.29 | Balance | 0.20 | 4453 | 62 |
| Formula 5 | 0.67 | 5.47 | 18.91 | 0.11 | 0.29 | Balance | 0.42 | 4652 | 62 |
| Formula 6 | 0.67 | 5.47 | 18.91 | 0.11 | 0.29 | Balance | 0.80 | 4927 | 62 |

As can be learned from the table above, the formula of Embodiment 1 did not contain $CrO_2$. The resulting main body 2 had hardness HRC of 62 and toughness of 4325 N/mm². As to Formula 7 that contained 0.20% $CrO_2$, the resulting main body 2 had hardness HRC of 62 and toughness of 4453 N/mm². As to Formula 8 that contained 0.67% $CrO_2$, the resulting main body 2 had hardness HRC of 62 and toughness of 4652 N/mm². As to Formula 9 that contained 0.80% $CrO_2$, the resulting main body 2 had hardness HRC of 62 and toughness of 4927 N/mm². It is thus clear that addition and increase of $CrO_2$ help to significantly increase the toughness of the main body 2. According to the present embodiment, it is determined that a formula composed of, by weight, C: 0.35%, W: 18.91%, Cr: 4.47%, Mn: 0.11%, V: 0.29%, $CrO_2$: 0.42%, and Fe for the balance to 100% is optimal for the main body 2.

Embodiment 5

The present embodiment is similar to Embodiment 1 except that in the present embodiment a resin powder is additionally used. The resin powder may be an epoxy powder or a phenolic resin powder. Preferably, the resin powder is an epoxy powder.

In the present embodiment, a high-speed machining tool made of a steel-bonded carbide comprises a skeleton 1, a main body 2, and a coating 3. The main body 2 is consolidated by the skeleton 1 from inside. The skeleton 1 and the main body 2 are both ringlike in shape. The main body 2 has its outer surface covered by the coating 3. Therein, the skeleton 1 comprises, by mass, C: 0.67%, W: 18.91%, Cr: 5.47%, Mn: 0.11%, V: 0.29%, and Fe for the balance to 100%. The main body 2 comprises, by mass, C: 0.67%, W: 18.91%, Cr: 5.47%, Mn: 0.11%, V: 0.29%, and Fe for the balance to 100%. The coating 3 comprises, by mass, $Cr_2C_3$: 28%, NiCr: 23%, WC: 8%, TaC: 8%, Co: 4%, the resin powder 8%, and Fe for the balance to 100%. The skeleton 1 has a thickness decreased gradually from an inner side to an outer side thereof so that a blade is formed at an edge of the outer side. The skeleton 1 is provided with a plurality of round through holes 4. Each of the round through holes 4 has two ends each formed into a spreading trumpet-like shape. Through the round through holes 4, parts of the main body 2 surrounding the skeleton 1 can be formed as a whole, so as to combine the main body 2 and the skeleton 1 into a unity through sintering, thereby ensuring the structural integrity of the steel-bonded carbide lathe tool.

Figure 3:
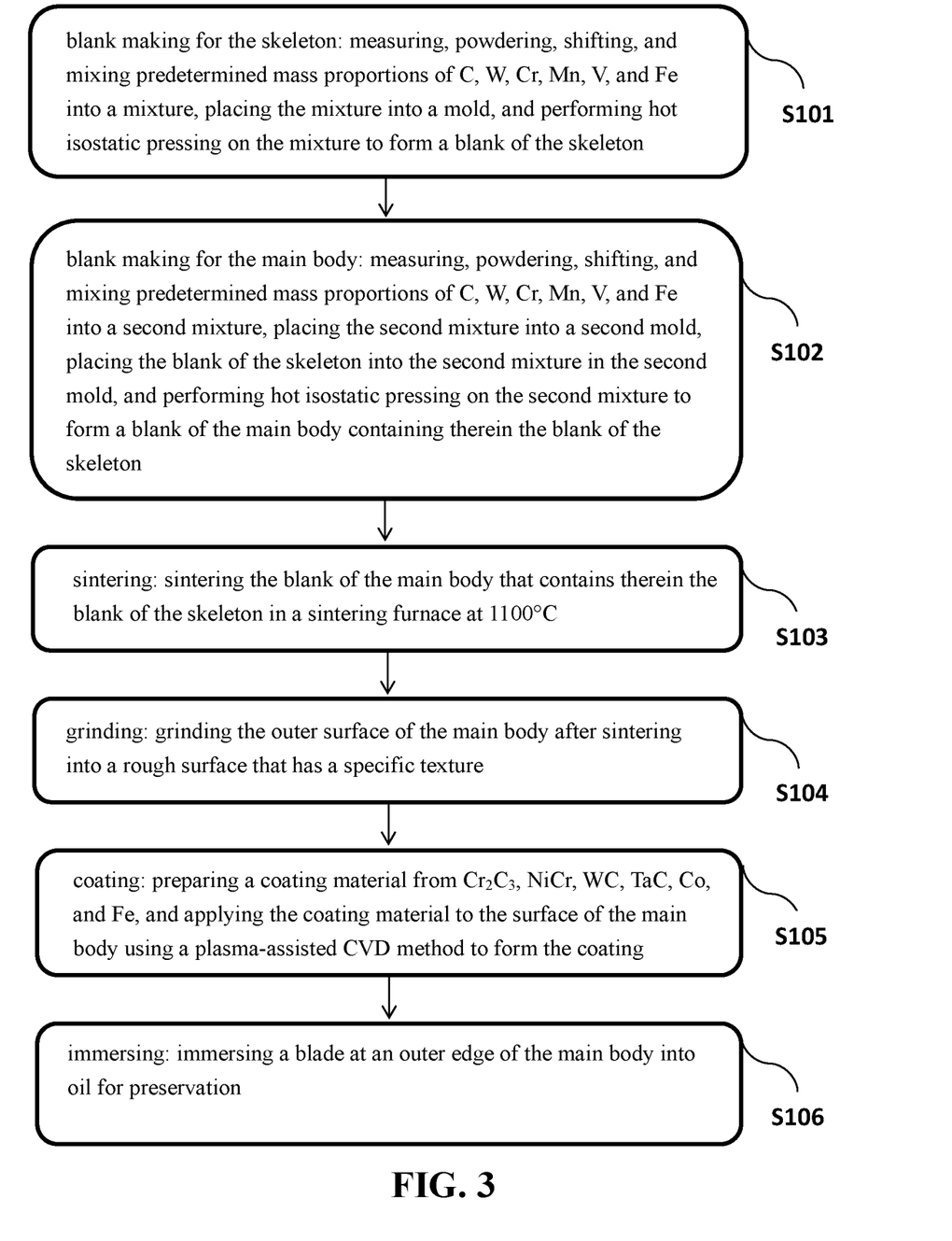
FIG. 3 is a flowchart of a method for preparing a high-speed machining tool from a steel-bonded carbide according to the present invention.

Referring to FIG. 3, for better illustrating preparation of the high-speed machining tool, the present embodiment provides a method for preparing the high-speed machining tool, which comprises the following steps:

S101, blank making for the skeleton 1: measuring, powdering, shifting, and mixing predetermined mass proportions of C, W, Cr, Mn, V, and Fe into a mixture, placing the mixture into a mold, and performing hot isostatic pressing on the mixture to form a blank of the skeleton 1, wherein the hot isostatic pressing is performed under a pressure of 500 MPa at 250° C. and the powder particle size is smaller than 1 μm;

S102, blank making for the main body 2: measuring, powdering, shifting, and mixing predetermined mass proportions of C, W, Cr, Mn, V, and Fe into a second mixture, placing a first half of the second mixture into a second mold, placing the blank of the skeleton 1 on the second mixture in the second mold, placing a second half of the second mixture in the second mold, and performing hot isostatic pressing on the second mixture to form a blank of the main body 2 containing therein the blank of the skeleton 1, wherein the hot isostatic pressing is performed under a pressure of 500 MPa at 250° C.;

S103, sintering: placing the blank of the main body 2 that contains therein the blank of the skeleton 1 into a sintering furnace, and sintering the blanks at 1100° C.;

S104, grinding: grinding the outer surface of the main body 2 after sintering into a rough surface that has a specific texture;

S105, coating: preparing a coating material from $Cr_2C_3$, NiCr, WC, TaC, Co, and Fe, and applying the coating material to the surface of the main body 2 using a plasma-assisted CVD method to form the coating 3; and S106, immersing: immersing a blade at an outer edge of the main body 2 into oil for preservation.

To sum up, in the disclosed high-speed machining tool and the method for preparing the same, the skeleton 1 is provided with a plurality of round through holes 4. Through the round through holes 4, parts of the main body 2 surrounding the skeleton 1 can be formed as a whole, so as to combine the main body 2 and the skeleton 1 into a unity through sintering, thereby ensuring the structural integrity of the steel-bonded carbide lathe tool. The high-speed machining tool is such made that the skeleton 1 is hard and the main body 2 is tough. With the configuration, vibrations can be transferred to the main body 2, thereby protecting the tool from brittle fractures and improving the overall performance of the tool. Besides, addition of $ZrO_2$ significantly increases the hardness of the skeleton 1 while basically retaining the toughness and eliminating generation of cracks, so the resulting tool is suitable for processing applications where high machining precision is expected form a high-hardness tool. Moreover, addition of $CrO_2$ significantly increases the toughness of the main body 2 and prevents the main body 2 from breakage.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A high-speed machining tool made of a steel-bonded carbide, the high-speed machining tool comprising a skeleton, a main body, and a coating; the main body being consolidated by the skeleton from inside; the skeleton and the main body both being ringlike in shape; the main body having an outer surface covered by the coating; the skeleton comprising, by mass, C: 0.6-0.8%, W: 12-22%, Cr: 2-8%, Mn: 0.1-0.6%, V: 0.1-0.6%, and Fe for the balance to 100%; the main body comprising, by mass, C: 0.1-0.6%, W: 12-22%, Cr: 2-8%, Mn: 0.1-0.6%, V: 0.1-0.6%, and Fe for the balance to 100%; the coating comprising, by mass, $Cr_2C_3$: 28-32%, NiCr: 21-28%, WC: 5-12%, TaC: 5-10%, Co: 3-5%, and Fe for the balance to 100%; and the skeleton having a thickness decreased gradually from an inner side to an outer side thereof so that a blade is formed at an edge of the outer side.

2. The high-speed machining tool of claim 1, wherein the skeleton is provided with a plurality of round through holes and each of the round through holes has two ends each formed into a spreading trumpet-like shape.

3. The high-speed machining tool of claim 2, wherein the skeleton comprises, by mass, C: 0.6-0.8%, W: 12-22%, Cr: 2-8%, Mn: 0.1-0.6%, V: 0.1-0.6%, F: 0-0.1%, and Fe for the balance to 100%.

4. The high-speed machining tool of claim 3, wherein the skeleton comprises, by mass, C: 0.6-0.8%, W: 12-22%, Cr: 2-8%, Mn: 0.1-0.6%, V: 0.1-0.6%, $ZrO_2$: 0.6-0.8%, F: 0-0.1%, and Fe for the balance to 100%.

5. The high-speed machining tool of claim 4, wherein the skeleton comprises, by weight, C: 0.67%, W: 18.91%, Cr: 5.47%, Mn: 0.11%, V: 0.29%, $ZrO_2$: 0.67%, F: 0.1%, and Fe for the balance to 100%.

6. The high-speed machining tool of claim 1, wherein main body comprises, by mass, C: 0.1-0.6%, W: 12-22%, Cr: 2-8%, Mn: 0.1-0.6%, V: 0.1-0.6%, $CrO_2$: 0.2-0.8%, and Fe for the balance to 100%.

7. The high-speed machining tool of claim 6, wherein the main body comprises, by mass, C: 0.35%, W: 18.91%, Cr: 4.47%, Mn: 0.11%, V: 0.29%, $CrO_2$: 0.42%, and Fe for the balance to 100%.

8. The high-speed machining tool of claim 1, wherein the coating comprises, by mass, $Cr_2C_3$: 28-32%, NiCr: 21-28%, WC: 5-12%, TaC: 5-10%, Co: 3-5%, a resin powder: 3-12%, and Fe for the balance to 100%.

9. The high-speed machining tool of claim 8, wherein the coating comprises, by mass, $Cr_2C_3$: 28%, NiCr: 23%, WC: 8%, TaC: 8%, Co: 4%, the resin powder: 8%, and Fe for the balance to 100%.

10. A method for preparing the high-speed machining tool of claim 1 from the steel-bonded carbide, comprising steps of:

S101, blank making for the skeleton: measuring, powdering, shifting, and mixing predetermined mass proportions of C, W, Cr, Mn, V, and Fe into a mixture, placing the mixture into a mold, and performing hot isostatic pressing on the mixture to form a blank of the skeleton;

S102, blank making for the main body: measuring, powdering, shifting, and mixing predetermined mass proportions of C, W, Cr, Mn, V, and Fe into a second mixture, placing the second mixture into a second mold, placing the blank of the skeleton into the second mixture in the second mold, and performing hot isostatic pressing on the second mixture to form a blank of the main body containing therein the blank of the skeleton;

S103, sintering: sintering the blank of the main body that contains therein the blank of the skeleton in a sintering furnace at 1100° C.;

S104, grinding: grinding the outer surface of the main body after sintering into a rough surface that has a specific texture;

S105, coating: preparing a coating material from $Cr_2C_3$, NiCr, WC, TaC, Co, and Fe, and applying the coating material to the surface of the main body using a plasma-assisted CVD method to form the coating; and S106, immersing: immersing a blade at an outer edge of the main body into oil for preservation.

* * * * *